Oct. 7, 1969    W. S. FUJITSUBO ET AL    3,470,730
ACCELEROMETER CALIBRATION METHOD
Filed Nov. 17, 1966

INVENTOR.
William S. Fujitsubo &
BY Frank A. Knopf
Thomas N. Young
ATTORNEY

United States Patent Office 3,470,730
Patented Oct. 7, 1969

3,470,730
ACCELEROMETER CALIBRATION METHOD
William S. Fujitsubo, Greendale, and Frank A. Knopf, Milwaukee, Wis., assignors to General Motors Corporation, Detroit, Mich., a corporation of Delaware
Filed Nov. 17, 1966, Ser. No. 595,102
Int. Cl. G01p 21/00
U.S. Cl. 73—1                                                    5 Claims

ABSTRACT OF THE DISCLOSURE

A method of inflight calibration of accelerometers is disclosed and comprises the preflight steps of mounting a statically calibrated accelerometer on a gyro stabilized platform, rotating the platform at a uniform rate and determining the effective radius between the rotational axis and the accelerometer, the inflight steps of rotating the platform at a rate related to the preflight rotational rate and comparing the inflight accelerometer output with the expected output based on the previously determined radius.

---

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This invention relates to accelerometers and, more particularly, to a method of calibrating accelerometers under zero gravity or uncertain gravity conditions such as are encountered during a space flight.

The flights of various air and space craft, herein called missiles, are commonly controlled by means of inertial navigation systems including one or more accelerometers. These accelerometers must begin the flight with and maintain during the flight a high degree of accuracy. Typically, this accuracy depends upon a preflight calibration as well as inflight control of instrument environment by, for example, heating the instrument throughout the flight to maintain a constant temperature. Such heating, of course, consumes power and for comparatively long missions, the total power consumption may become intolerable. Moreover, even with such temperature control, accelerometer accuracy is subject to degradation such that inflight calibration is desirable.

Accelerometer calibration, either preflight or inflight, requires the introduction of a force upon the accelerometer of a known magnitude and direction. At or near the earth's surface, gravity typically supplies this force. However, in space missions, an inflight calibration requires such a calibrating force to be artificially manufactured.

In acordance with the invention, an accelerometer of the type used in inertial navigation systems may be accurately tested in flight under zero gravity or uncertain gravity conditions to determine the degree of calibration degradation and the resulting necessity for adjustment. In general, this is accomplished by means of a method involving preflight system calibration and inflight calibration verification. The preflight portion of the method involves rotating the accelerometer about a system axis to subject the accelerometer to an acceleration along an input axis thereof and determining from one or more accelerometer readings the effective radius between the system axis and the accelerometer. The inflight portion of the method involves the rotation of the accelerometer about the system axis at a rate which bears a known relation to the preflight rotation rate and, using the previously determined effective radius, essentially comparing the resulting inflight output of the accelerometer to that which is expected on the basis of the preflight calibration.

The invention may be best understood by referring to the following detailed description of a specific example thereof. This explanation is to be taken with the accompanying drawings of which:

STEP I

Figure 1:
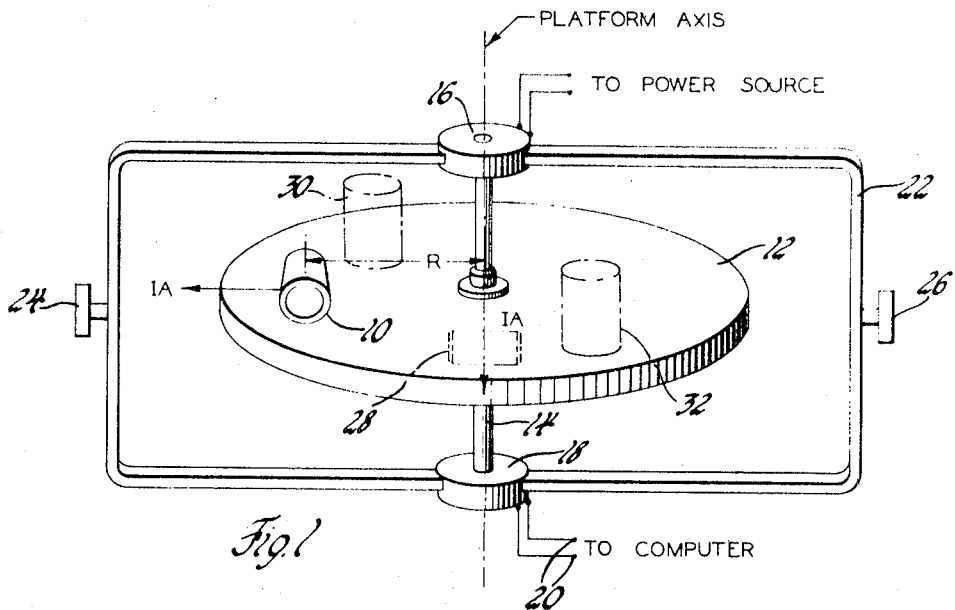
FIGURE 1 is a simplified view of a portion of an inertial navigation system employing single-axis acceleometer to which the invention may be applied.

The first step in the illustrative application of the inventive method involves placing the accelerometer to which the invention is to be applied in a system for use in obtaining acceleration readings. Referring to FIGURE 1, this step involves mounting an accelerometer 10 which is a single axis device on a stabilized platform 12. The platform is mounted on a shaft 14 for rotation about a system axis which is defined by the shaft. The accelerometer 10 is suitably mounted on the platform 12 at a radial distance from the system axis defined by shaft 14 such that the input axis IA of the device lies along the radius $r$. Shaft 14 is mechanically connected on one end to a torque motor 16 which, as indicated, is energizable by a power source to rotate the platform 12 about the system axis. Shaft 14 is mechanically connected on the other end to a tachometer generator 18 which produces an output indicative of the rotation rate produced by motor 16. The output of tachometer 18 may be connected to a flight computer by means of terminals 20. The combination of the platform 12, torque motor 16, and tachometer 18 is mounted in a generally rectangular gimbal ring 22. Ring 22 may be part of a four-gimbal support system by which the assembly may be maintained in a fixed orientation in space regardless of the attitude of the missile which carries the system. Accordingly, ring 22 is provided with supports 24 and 26 which may receive the next gimbal ring in the support system.

The apparatus thus far described may be employed in an inertial navigation system wherein it is desirable to measure accelerations of the system along at least two angularly spaced axes. Accordingly, platform 12 carries a second accelerometer 28 having an input axis IA which is orthogonal with the input axis of accelerometer 10. In addition, platform 12 may carry gyros 30 and 32 which may be connected into servo control loops (not shown) to gyroscopically stabilize platform 12. Gyro stabilization systems are well known in the art and thus will not be described in detail.

The accelerometer 10 is presumed to have been statically calibrated either prior to mounting upon platform 12 or sometime following the mounting but prior to use in flight control. In the following, it is to be assumed that the description of steps performed on accelerometer 10 also describes similar and preferably simultaneous steps performed on accelerometer 28 unless otherwise indicated. In addition, it is to be understood that the method is not limited to single-axis devices.

STEP II

Having mounted the accelerometer 10 upon the gyro stabilizer platform 12, the preflight portion of the calibration method is performed. This step involves energization or torque motor 16 so as to rotate platform 12 about the system axis 14 thereby subjecting accelerometer 10 to a radial acceleration. This rotation is preferably performed at a fairly high rate, i.e., 12 radians per second and is uniform. The precise rotational rate is controlled by monitoring the output from generator 18.

STEP III

With the platform mounted accelerometer 10 rotating about the axis defined by shaft 14 at a uniform rate, the output of accelerometer 10 is used to determine the effective radius $r$ between the system axis and the accelerometer 10. This radius is to be employed during the inflight portion of the calibration method and thus is preferably calculated by means of a computer of the general purpose type typically employed in inertial navigation systems.

STEP IV

After a predetermined portion of a missile flight schedule has been performed, the inflight portion of the calibration method is carried out to determine the degree of degradation of the accuracy of accelerometer 10. This step and the following steps are preferably carried out during a coast condition of the missile during which either zero gravity or uncertain gravity conditions may obtain. The torque motor 16 is reenergized to bring the platform 12 up to a uniform rotation rate which bears a known relationship to the rotation rate employed during the prelaunch calibration phase. Preferably, a one to one ratio between the preflight and inflight rotation rate is employed.

STEP V

Assuming the platform 12 to be rotating the accelerometer 10 about the system axis at a uniform rate equal to the preflight rotational rate, the output of accelerometer 10 is again monitored. Since the angular rate and the effective radius $r$ are the same during the inflight calibration phase and the preflight calibration phase, the accelerometer reading taken during the inflight phase should compare with those taken during the preflight phase. Any discrepancy between the readings indicates an error for which the accelerometer 10 must be recalibrated for compensation. Again, this inflight calibration step is best accomplished with the use of a navigation computer.

It will be noted that the preflight and inflight rotational steps may be performed using several predetermined rotation rates thereby to calibrate the accelerometer 10 over a range of readings.

Figure 2:
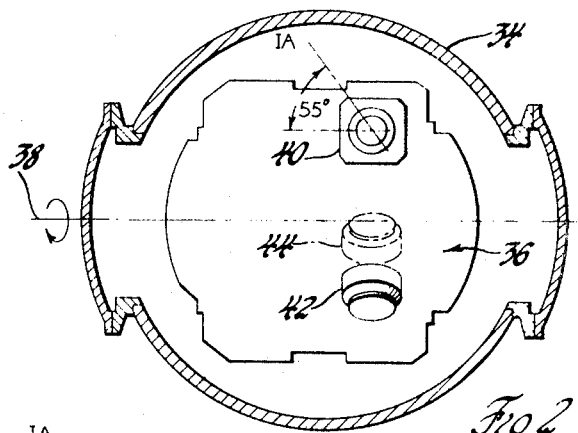
FIGURE 2 is a simplified sectional view of another inertial navigation apparatus to which the invention may be applied.
Figure 3:
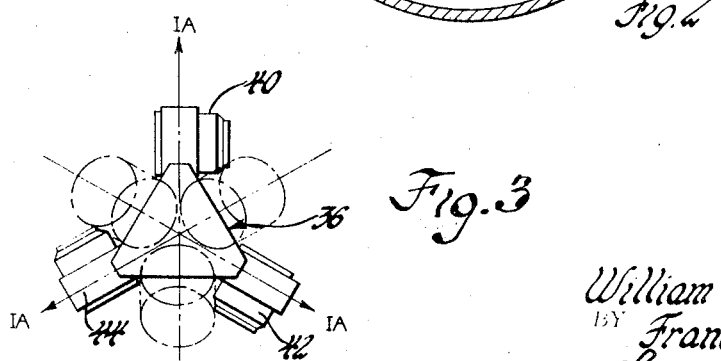
FIGURE 3 is an end view of the FIGURE 2 apparatus illustrating the location of accelerometers thereon.

FIGURES 2 and 3 show an arrangement by which the above described calibration technique may be simultaneously applied to a triad of single-axis accelerometers. The arrangement comprises a substantially spherical housing 34 carrying a platform 36 which is adapted for rotation about a system axis 38. Mounted on the platform are three-single axis accelerometers 40, 42, and 44. The accelerometers may be accompanied by a triad of gyros which are indicated in FIGURE 4 by phantom lines. The input axes of the accelerometers 40, 42 and 44 are spaced at equal angles of 120° as indicated in FIGURE 3. In addition, the projections input axes are aligned at an angle of approximately 55° with the system axis 38. The preferred configuration of the apparatus shown in FIGURES 2 and 3 is one in which the output axes of the accelerometer 40, 42, and 44 lie in a plane which is normal to the rotational axis 38. As will be apparent to those skilled in the art, a uniform rotational rate of platform 36 about the axis 38 subjects each of the accelerometers 40, 42 and 44 to an acceleration having a component which lies along the input axis of each accelerometer.

A detailed description of a specific example of the inventive method has been given above. It is to be understood that various modifications to this detailed example are possible. Thus the description is not to be construed in a limiting sense. For a definition of the invention, reference should be had to the appended claims.

What is claimed is:

1. A method of system-calibrating an accelerometer having an input axis comprising the preflight steps of placing a statically calibrated accelerometer in a system for use, rotating the accelerometer about a system axis bearing a known angular relation with the input axis at a first uniform angular rate, thereby to subject the accelerometer to an acceleration having a component along said input axis determining the effective radius between the accelerometer and the system axis, and the inflight steps of rotating the accelerometer about the system axis at a second uniform rate bearing a known relation with the first rate, and from the previously determined effective radius, determining the degree of non-correspondence between the measured output of the accelerometer and the expected output.

2. The method defined in claim 1 wherein said placing step involves mounting the accelerometer on a gyro-stabilized platform having an axis of rotation.

3. The method defined in claim 1 wherein the first and second angular rates are related by a 1:1 ratio.

4. A method of preparing for and carrying out an inflight calibration of a system-mounted accelerometer comprising the steps of a preflight uniform rotation of the accelerometer about a system axis which subjects the accelerometer to an acceleration along an input axis thereof, a determination of the effective radius between the system axis and the accelerometer, an inflight uniform rotation of the accelerometer about the system axis at a rate equal to that of the preflight rotation, and using the previously determined radius, a comparison of the inflight output of the accelerometer with the expected output.

5. The method of accelerometer calibration comprising an initial step followed by the steps defined in claim 4, the initial step including mounting a statically-calibrated accelerometer upon a gyro-stabilized platform having an axis of rotation corresponding to said system axis.

References Cited

UNITED STATES PATENTS

| | | | |
|---|---|---|---|
| 2,954,691 | 10/1960 | Fulcher et al. | 73—1 |
| 3,350,916 | 11/1967 | Book | 73—1 |

OTHER REFERENCES

Moskowitz, Instruments & Control Systems, vol. 34, February 1961, pp. 257–60.

S. CLEMENT SWISHER, Primary Examiner

UNITED STATES PATENT OFFICE
CERTIFICATE OF CORRECTION

Patent No. 3,470,730 October 7, 1969

William S. Fujitsubo et al.

It is certified that error appears in the above identified patent and that said Letters Patent are hereby corrected as shown below:

Column 2, line 68, "stabilizer" should read -- stabilized --. Column 3, line 35, "reading" should read -- readings --; line 53, "FIGURE 4" should read -- FIGURE 3 --; line 57, after "projections" insert -- of the --. Column 4, line 53, "Book" should read -- Bock --.

Signed and sealed this 3rd day of March 1970.

(SEAL)
Attest:

Edward M. Fletcher, Jr.
Attesting Officer

WILLIAM E. SCHUYLER, JR.
Commissioner of Patents